(12) United States Patent
Chandran et al.

(10) Patent No.: US 7,264,682 B2
(45) Date of Patent: Sep. 4, 2007

(54) TITANIUM BORIDE COATINGS ON TITANIUM SURFACES AND ASSOCIATED METHODS

(75) Inventors: K. S. Ravi Chandran, Salt Lake City, UT (US); Shampa Aich, Lincoln, NE (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 11/122,119

(22) Filed: May 3, 2005

(65) Prior Publication Data

US 2005/0208213 A1  Sep. 22, 2005

(51) Int. Cl.
*C22C 14/00* (2006.01)
*C22C 8/60* (2006.01)

(52) U.S. Cl. .................. 148/210; 148/421; 148/217

(58) Field of Classification Search ............... 148/210, 148/217, 421, 206
See application file for complete search history.

(56) References Cited

U.S. PATENT DOCUMENTS

| | | | |
|---|---|---|---|
| 3,028,162 A | 4/1962 | Samuel et al. |
| 3,251,719 A | 5/1966 | Tepper et al. |
| 3,634,145 A | 1/1972 | Homan |
| 3,673,005 A | 6/1972 | Kunst |
| 3,676,371 A | 7/1972 | Zollner et al. |
| 3,787,245 A | 1/1974 | Kunst |
| 3,806,374 A | 4/1974 | Krzyminski |
| 3,809,583 A | 5/1974 | Krzyminski |
| 3,870,569 A | 3/1975 | Krzyminski |
| 3,936,327 A | 2/1976 | Fichtl et al. |
| 3,937,619 A | 2/1976 | Clougherty |
| 3,999,954 A | 12/1976 | Kolaska et al. |
| 4,011,107 A | 3/1977 | Hayes |
| 4,019,873 A | 4/1977 | Reiter |
| 4,040,870 A | 8/1977 | Holzl |

(Continued)

FOREIGN PATENT DOCUMENTS

WO WO 2004/046262 A2  6/2004

OTHER PUBLICATIONS

Aich et al., TiB Whisker Coating on Titanium Surfaces by Solid-State Diffusion: Synthesis, Microstructure, and Mechanical Properties, Nov. 1, 2002, Metallurgical and Materials Transactions, vol. 33A, No. 11, 3489-3498.*

(Continued)

*Primary Examiner*—Roy King
*Assistant Examiner*—Jessee Roe
(74) *Attorney, Agent, or Firm*—Thorpe North & Western LLP

(57) ABSTRACT

A borided titanium article can include a titanium mass having titanium monoboride whiskers infiltrating inward from a surface of the titanium mass to form an integral surface hardened region. The titanium mass can be almost any titanium based metal or alloy such as high purity titanium, commercial grade titanium, α-titanium alloy, α+β titanium alloy, β-titanium alloy, titanium composite, and combinations thereof. Borided titanium articles can be formed by methods which include providing a titanium mass, contacting a surface of the titanium mass with a boron source medium, and heating the titanium mass and boron source medium to a temperature from about 700° C. to about 1600° C. The boron source medium can include a boron source and an activator selected to provide growth of titanium monoboride whiskers.

9 Claims, 4 Drawing Sheets

U.S. PATENT DOCUMENTS

| | | | |
|---|---|---|---|
| 4,126,488 | A | 11/1978 | Kunst et al. |
| 4,268,582 | A | 5/1981 | Hale et al. |
| 4,289,545 | A | 9/1981 | Thevenot et al. |
| 4,353,885 | A | 10/1982 | Hoekje |
| 4,398,968 | A | 8/1983 | Koyama et al. |
| 4,402,764 | A | 9/1983 | Clark et al. |
| 4,404,045 | A | 9/1983 | Thevenot et al. |
| 4,459,328 | A | 7/1984 | Mizuhara |
| 4,536,224 | A | 8/1985 | Beyer et al. |
| 4,637,837 | A | 1/1987 | von Matuschka et al. |
| 4,673,550 | A | 6/1987 | Dallaire et al. |
| 4,692,385 | A | 9/1987 | Johnson |
| 4,844,949 | A | 7/1989 | Arai et al. |
| 4,857,116 | A | 8/1989 | Allam et al. |
| 4,906,430 | A | 3/1990 | Abkowitz et al. |
| 4,957,421 | A | 9/1990 | Baldi |
| 4,968,348 | A | 11/1990 | Abkowitz et al. |
| 4,971,624 | A | 11/1990 | Clark et al. |
| 5,118,026 | A | 6/1992 | Stacher |
| 5,187,128 | A | 2/1993 | White et al. |
| 5,296,419 | A | 3/1994 | White et al. |
| 5,378,327 | A | 1/1995 | Sekhar et al. |
| 5,399,207 | A | 3/1995 | Kemp |
| 5,455,068 | A | 10/1995 | Aves et al. |
| 5,464,699 | A | 11/1995 | Baldi |
| 5,573,604 | A | 11/1996 | Gerdes |
| 5,620,521 | A | 4/1997 | Tachikawa et al. |
| 5,702,448 | A | 12/1997 | Buechel et al. |
| 5,745,990 | A | 5/1998 | Lee et al. |
| 5,799,238 | A | 8/1998 | Fisher, II et al. |
| 5,868,796 | A | 2/1999 | Buechel et al. |
| 5,966,585 | A | 10/1999 | Sue |
| 6,024,915 | A | 2/2000 | Kume et al. |
| 6,245,162 | B1 | 6/2001 | Baudis et al. |
| 6,287,711 | B1 * | 9/2001 | Nieh et al. ................. 428/627 |
| 6,306,225 | B1 | 10/2001 | Hunger et al. |
| 6,428,885 | B1 | 8/2002 | Seitz et al. |
| 6,458,218 | B1 | 10/2002 | Savich |
| 6,478,887 | B1 | 11/2002 | Sue et al. |
| 6,503,344 | B2 | 1/2003 | Baudis et al. |
| 6,551,371 | B1 | 4/2003 | Furuta et al. |
| 6,770,358 | B2 | 8/2004 | Berger et al. |
| 2001/0041230 | A1 | 11/2001 | Hunger et al. |
| 2003/0047463 | A1 | 3/2003 | Ward-Close et al. |
| 2003/0099762 | A1 | 5/2003 | Zhang et al. |

OTHER PUBLICATIONS

Soboyejo et al., Mechanical Behavior of Damage Tolerant TiB Whisker-Reinforced In Situ Titanium Matrix Composites, 1994, Acta metall. mater., vol. 42, No. 8, 2579-2591.*

Krzyminski et al, Treatment of Refractory Metals. I: Method Technology. II: Constitution and Characteristics of the Boride Layers, 1973, HTM 28, No. 2, 100-109.*

Davis et al, ASM Handbook, 1996, ASM International, vol. 4, p. 437-445.*

Melendez et al, Using the thermochemical process of boriding in obtaining extreme slide-wear resistance, 1994, Metalurgia y Mater., vol. 1, No. 3, abstract only.*

Sioshansi, Piran, "Improving the Properties of Titanium Alloys by Ion Implanatation", Applied Technology, Mar. 1990, pp. 1-2.

Sahay, S.S. et al., "Evolution of Microstructure and Phases in in situ Processed Ti-TiB composites Containing High Volume Fraction of TiB Whiskers", J. Mater. Res., Nov. 1999, pp. 4214-4223, vol. 14, No. 11.

Banerjee, Rajarshi, "Laser Deposition of In Situ Ti-TiB Composites", Advanced Engineering Materials, 2002, pp. 1-5, vol. 4, No. 11.

Alman, D.E. et al., "The Abrasive Wear of Sintered Titanium Matrix-Ceramic Particle Reinforced Composites", Wear, 1999, vol. 225-229, pp. 629-639.

Sup Lee, Chang et al., "Improvement of Hardness and Wear Resistance of (TiC, TiB)/Ti-6Al-4V Surface-Alloyed Materials Fabricated by High-Energy Electron-Beam Irradiation, Metallurgical and Materials Transactions", Jul. 2003, pp. vol. 34A.

Kooi, B.J. et al., "The Evolution of Microstructure in a Laser Clad TiB-Ti Composite Coating", Acta Materialia, 2003, pp. 831-845, vol. 51.

Matiasovsky, K. et al., "Electrochemical and Thermochemical Boriding in Molten Salts", Surface and Coatings Technology, 1988, pp. 133-149, vol. 35.

Ueda, N. et al., "Boriding of Nickel by the Powder-Pack Method", Surface and Coatings Technology, 2000, pp. 25-30, vol. 126.

Jain, Vipin, et al., Influence of the Pack Thickness of the Boronizing Mixture on the Boriding of Steel, Surface and Coatings Technology, 2002, pp. 21-26, vol. 149.

Meric, Cevdet et al., "Investigation of the Effect on Boride Layer of Powder Particle Size Used in Boronizing with Solid Boron-Yielding Substances", Materials Research Bulletin, 2000, pp. 2165-2172, vol. 35.

Matuschka, Alfred Von Graf, "Boronizing", Heyden & Son, Inc. Philadelphia, 1980, pp. 11-31.

* cited by examiner

TITANIUM BORIDE COATINGS ON TITANIUM SURFACES AND ASSOCIATED METHODS

This invention was made with government support under Grant No. DAAL-19-99-1-0281 awarded by the Army Research Office. The United States Government has certain rights to this invention.

CLAIM OF PRIORITY

This application claims the benefit of PCT International Application No. PCT/US2003/036833, filed Nov. 17, 2003 which claims priority to U.S. Provisional Patent Application No. 60/426,636, filed Nov. 15, 2002, which are each incorporated by reference in their entireties.

FIELD OF THE INVENTION

The present invention relates generally to titanium coatings. More particularly, the present invention relates to titanium boride coatings on titanium surfaces.

BACKGROUND OF THE INVENTION

Titanium and titanium alloys are useful for a wide variety of structural and engineering applications. Titanium and its alloys are generally characterized by low density, high stiffness, high strength, and good corrosion resistance. The aerospace industry is currently the predominant consumer of titanium and its alloys. Further, recent interest in using titanium has begun to increase in other industries such as the chemical, petrochemical, and medical industries. However, when compared to current hard metal alternatives, titanium and its alloys suffer from lower surface hardness, wear resistance, corrosion resistance, lower oxidation resistance, galling, and seizure of surfaces when in mechanical contact.

A number of methods have been developed to improve the surface properties of titanium and its alloys. For example, titanium surfaces can be coated with titanium nitride and titanium carbide using a number of known technologies such as ion implantation, laser gas nitriding, electron-beam surface alloying, and physical and chemical deposition. Further, boron alloying of titanium surfaces has been accomplished by techniques such as laser irradiation and electron-beam irradiation. Several of these methods have produced titanium having significantly improved surface properties. However, such methods frequently involve substantial equipment expense and extended production times which make the finished product relatively expensive. Additionally, several of these methods have limitations as to achievable coating thicknesses. Further, laser and electron beam methods also result in melting of surface regions of titanium which leads to oxidation of the metal, coarsening of surface structure and poor properties. Frequently, these methods also result in monolithic coating structures on titanium surfaces which tend to crack and spall under applied stresses.

For this and other reasons, the need remains for methods and materials which can improve the surface properties of titanium and its alloys, which have decreased manufacturing costs and improved resistance to wear and oxidation.

SUMMARY OF THE INVENTION

It would therefore be advantageous to develop improved methods and materials which produce a titanium material having high wear, corrosion, and oxidation resistance as well as resistance to galling and seizure when in contact with other surfaces. The present invention provides methods and materials which produce whisker borided titanium articles which avoid many of the difficulties mentioned above.

In one aspect of the present invention, a borided titanium article can include a titanium mass having titanium monoboride whiskers infiltrating the titanium mass to form a surface hardened region. The surface hardened regions can become an integral part of the titanium mass, unlike traditional coatings. The titanium mass can be almost any titanium based metal or alloy such as high purity titanium, commercial grade titanium, α-titanium alloy, α+β titanium alloy, β-titanium alloy, and combinations thereof.

In another aspect of the present invention, the borided titanium article can include one or more titanium diboride layers adjacent the surface hardened regions.

In accordance with one aspect of the present invention, a method of forming a whisker borided titanium article can include providing a titanium mass, contacting a surface of the titanium mass with a boron source medium, and heating the titanium mass and boron source medium to a temperature from about 700° C. to about 1600° C. The boron source medium can include a boron source and an optional activator selected to provide accelerated growth of titanium monoboride whiskers. In one aspect of the present invention, the boron source medium can consist essentially of a boron source. Alternatively, the boron source medium can comprise a boron source and an activator. The boron source medium can be provided as a solid particulate mixture, liquid mixture, or as a gaseous mixture. During heating, boron from the boron source medium diffuses toward the titanium mass and infiltrates thereinto to form titanium monoboride whiskers which increase the surface hardness, corrosion resistance, and wear resistance of the treated surface.

Additional features and advantages of the invention will be apparent from the following detailed description, which illustrates, by way of example, features of the invention.

It should be noted that several of the above figures are not drawn to scale and no limitations as to physical dimensions of the present invention are intended thereby. For example, the thicknesses of the layers and regions may vary significantly from those illustrated. Those skilled in the art will recognize thicknesses and dimensions which can be used for various applications given the detailed description below.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "a surface hardened region" includes reference to one or more of such regions, and "a boron source" includes reference to one or more of such materials.

Figure 2:
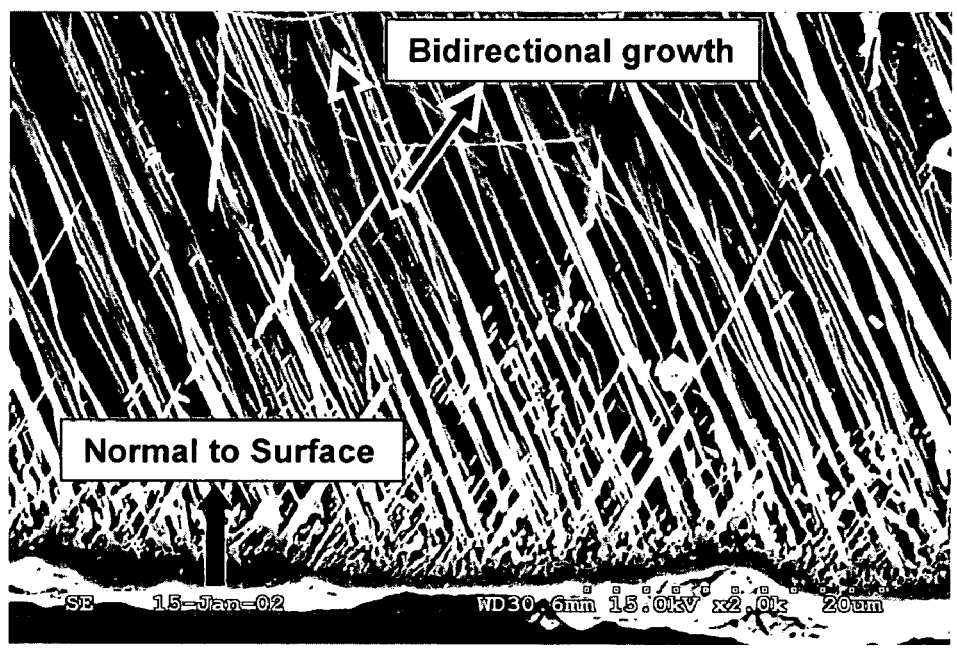
FIG. 2 shows a micrograph of the surface hardened region in a whisker borided titanium article produced in accordance with an embodiment of the present invention at a magnification of 2000×.

As used herein, "whisker" refers to a nanostructure having a high aspect ratio, i.e. greater than about 5:1. Typically, whiskers have a generally polygonal cross-section; however cross-sections may vary somewhat, e.g., hexagonal, diamond, and circular, as seen in FIG. 2. Whisker diameters are most frequently in the nanometer range; however diameters can vary from about 50 nm to about 3 μm, although preferred diameters are from about 100 nm to about 600 nm.

As used herein, "infiltrating" refers to a process or state wherein a material penetrates interstitial spaces of a separate material from an external position, typically from the surface of the separate material.

As used herein, "borided" refers to the presence of boron in a composition or material. Further, borided is used to indicate that the boron is introduced into the composition or material subsequent to formation of the composition or material into a coherent mass.

As used herein, "activator" refers to any material which is capable of encouraging growth of titanium monoboride whiskers. Although the precise mechanism is in no way limited, the activator can act to increase mobility and diffusion of boron atoms into a substrate. Additionally, suitable activators can decrease the activation energy required for production of titanium monoboride whiskers.

As used herein, "amorphous" refers to a non-crystalline state of a material. Thus, an amorphous material can be entirely or at least substantially non-crystalline. Amorphous solids are typically produced by rapid cooling of a liquid material which does not allow individual atoms to form a crystalline lattice.

As used herein, "high purity titanium" refers to substantially pure titanium having less than about 0.1 atomic percent impurities.

As used herein, "commercial grade titanium" refers to substantially pure titanium having from about 0.1 atomic percent to about 2 atomic percent impurities. Common impurities can include O, Fe, Pd, and other trace elements.

As used herein, "α-titanium alloys" refers to alloys of titanium containing Al, O, Zr, Sn, Mo, N, V, C, Ta, Si, and combinations thereof. Several exemplary α-titanium alloys include: Ti-5Al-2.5Sn, Ti-8Al-1Mo-1V, and Ti-6Al-2Nb-1Ta-1Mo (compositions provided in weight percent).

As used herein, "α+β titanium alloys" refers to alloys of titanium containing Al, O, Zr, Sn, Mo, N, V, C, Ta, Si, and combinations thereof and β-stabilizing elements such as Fe, V, Mo, Cr, Nb, W, Ta, and combinations thereof. Several exemplary α+β titanium alloys include: Ti-6Al-4V, Ti-6Al-2Sn-4Zr-2Mo, and Ti-6Al-2Sn-4Zr-6Mo (compositions provided in weight percent).

As used herein, "β-titanium alloys" refers to alloys of titanium containing relatively large amounts of Fe, V, Mo, Cr, Nb, W, Ta, and combinations thereof and smaller amounts of Al, O, Zr, Sn, Mo, N, V, C, Ta, Si, and combinations thereof. Several exemplary β-titanium alloys include: Ti-10V-2Fe-3Al, Ti-15Mo-5Zr-3Al, and Ti-13V-11Cr-3Al (compositions provided in weight percent).

As used herein, "β-transus temperature" refers to the temperature at which a material undergoes a phase transformation from the α phase to the β phase, i.e. a change in crystalline structure to the β phase associated with a specific material. It should be noted that the β-transus temperature of titanium and its alloys is a function of composition. For example, commercial grade titanium has a β-transus temperature of about 860° C., while an α+β titanium alloy having 6 wt % Al and 4 wt % V has a β-transus temperature of about 1010° C.

As used herein, "substrate" refers to a mass of material which can provide mechanical support and properties to a material.

As used herein, "region" refers to a defined area or volume of a material. A region can be identified and bounded either by a distinct interface between two materials having different compositions or by a gradual change in composition from one region to an adjacent region.

As used herein, "adjacent" refers to a spatial relationship of at least two materials, wherein the materials have a common boundary.

As used herein, "primarily" refers to a quantity of an identified element which comprises greater than fifty percent of a composition.

As used herein, "substantially free of" refers to the lack of meaningful quantities of an identified element or agent in a composition. Particularly, elements that are identified as being "substantially free of" are either completely absent from the composition, or contain amounts which are small enough so as to have no measurable effect on the identified properties of the composition.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 μm to about 200 μm should be interpreted to include not only the explicitly recited limits of 1 μm and about 200 μm, but also to include individual sizes such as 2 μm, 3 μm, 4 μm, and sub-ranges such as 10 μm to 50 μm, 20 μm to 100 μm, etc.

Borided Titanium Articles

Figure 1:
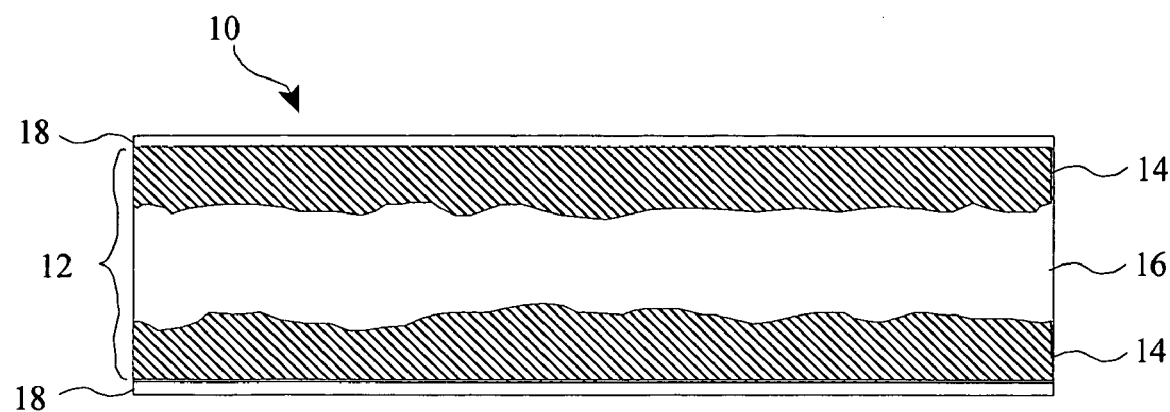
FIG. 1 illustrates a side cross-sectional view of an embodiment showing a whisker borided titanium article in accordance with the present invention.

Referring now to FIG. 1, in accordance with one embodiment of the present invention, a whisker borided titanium article 10 can include a titanium mass 12 having titanium monoboride whiskers infiltrating the titanium mass to form a surface hardened region 14. The surface hardened region can cover an entire surface of the titanium mass or merely a portion thereof. In one aspect of the present invention, the surface hardened region can be characterized by titanium monoboride whiskers grown into the titanium substrate. These titanium monoboride whiskers can be primarily initiated from an exterior surface of the titanium mass. Thus, the whiskers are predominantly infiltrated inward into the titanium mass. As can be seen in FIG. 2, a majority of the whiskers, seen as light needle structures, are oriented in a directed pattern away from the surface. Generally, the whiskers can grow in a bi-directional pattern along crystallographic planes of the titanium mass, as shown in FIG. 2. Although the whiskers can be somewhat random under certain conditions, most commonly the titanium monoboride whiskers are bidirectional and are typically less than about 45° from normal to the surface of the titanium mass from which they are infiltrated. Further, the whiskers of the present invention tend to form either interwoven or interconnected whisker structures such as those shown in FIG. 2. In one detailed aspect of the present invention, the titanium monoboride whiskers can have a structure which indicates an identifiable source of growth from a surface. The titanium monoboride structures of the present invention are infiltrated into the titanium mass and form an integral part of the final borided titanium article. Thus, the surface hardened regions of the present invention are not easily peeled or separated from the surface. Such structures are considered to have improved surface properties over typical coating processes, such as titanium carbide and titanium nitride, which typically form an additional layer on an external surface of the titanium mass.

Titanium monoboride whiskers of the present invention can have a wide variety of dimensions. In one aspect, the titanium monoboride whiskers can have an average length of from about 10 μm to about 700 μm. In a currently preferred aspect, the titanium monoboride whiskers can have an average length of from about 50 μm to about 300 μm. Similarly, the average diameter of the titanium monoboride whiskers can be from about 100 nm to about 2 μm, and can preferably range from about 100 nm to about 600 nm. In yet another detailed aspect, the titanium monoboride whiskers can have an average aspect ratio from about 5:1 to about 1000:1. Although dimensions outside of these ranges can also be used, the above ranges have provided marked improvement in titanium surface properties such as hardness, wear resistance, oxidation resistance, corrosion resistance, and reduced galling and seizure.

Depending on the titanium mass employed and the specific conditions used in forming the titanium monoboride whiskers, the surface hardness can generally range from about 150 kgf/mm$^2$ to about 3500 kgf/mm$^2$. In one aspect of the present invention, surface hardness of the borided titanium article can range from about 1800 kgf/mm$^2$ to about 3500 kgf/mm$^2$. In an additional aspect of the present invention, the surface hardness of the final borided titanium article can be from about 2 to about 8 times harder than the non-borided titanium mass, and preferably from about 4 to about 5 times harder.

The embodiment of FIG. 1 illustrates surface hardened regions 14 on either side of a titanium region 16. In this embodiment, the titanium mass 12 has titanium monoboride whiskers infiltrated therein. The surface hardened regions 14 are characterized by high concentrations of whiskers. Typically, the titanium monoboride whiskers can comprise from about 50 wt % to about 95 wt % of the surface hardened region. As can be seen from FIG. 2, the boundary between the surface hardened region and the bulk titanium region is not always as distinct as indicated in FIG. 1. Specifically, the concentration of whiskers typically decreases at depths further into the titanium mass. In one detailed aspect of the present invention, the surface hardened region can have an average thickness from about 15 μm to about 400 μm. Those skilled in the art will recognize that useful thicknesses outside of this range can also be produced using the methods described below and such thicknesses are considered within the scope of the present invention. Studies have shown that a small amount, e.g., less than a few weight percent, of titanium diboride can also be present in the surface hardened region.

Figure 3:
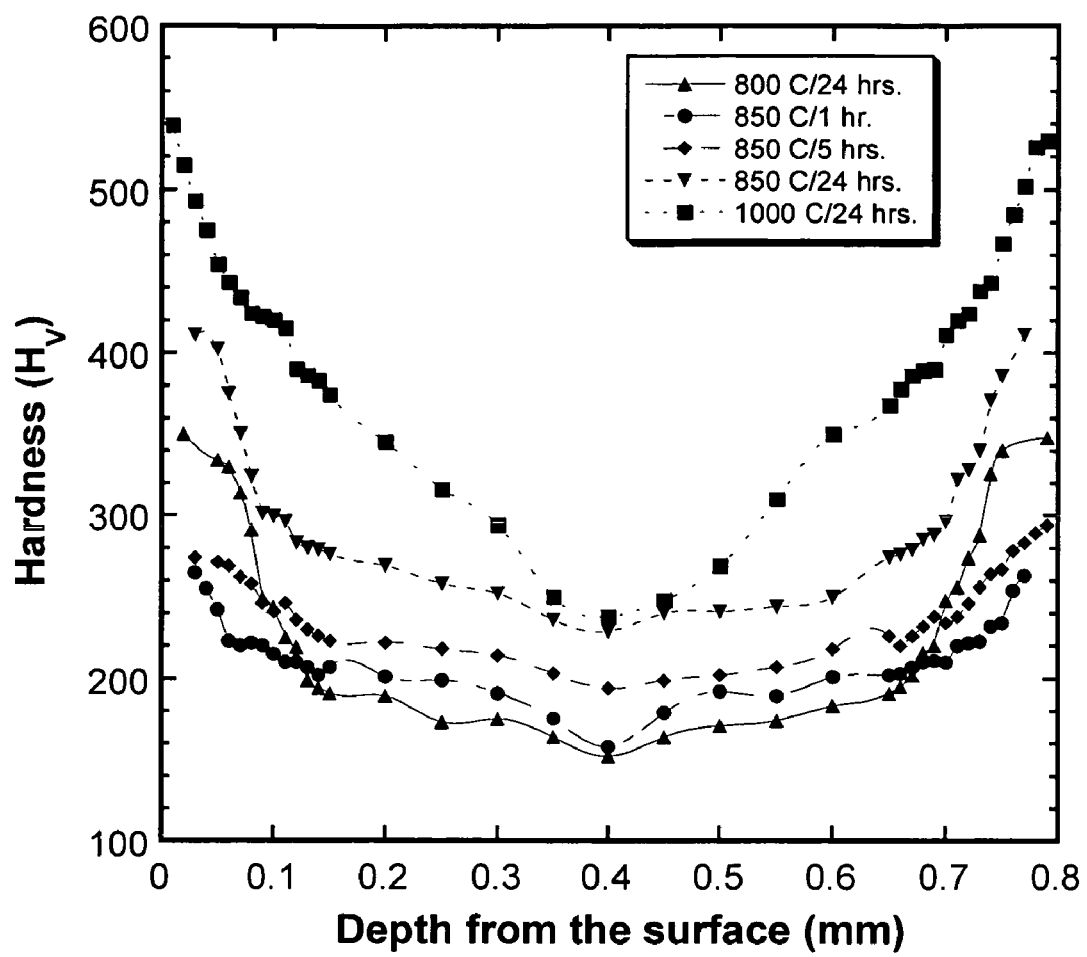
FIG. 3 is a graph of hardness versus depth along a cross-section of whisker borided titanium articles formed at various temperatures and process times.
Figure 4:
FIG. 4 is a micrograph of a midthickness of the borided titanium article of FIG. 2 showing randomly precipitated TiB whiskers.

As described in connection with the methods, described below, used to form such borided titanium articles, there can often be a region in which a small number of whiskers are present. Typically, this region can have less than about 0.5 wt % titanium monoboride whiskers. As can be seen from FIG. 3, even small amounts of titanium monoboride whiskers can affect improved hardness. FIG. 3 shows a hardness profile of several thin, i.e. 1 mm, borided articles in accordance with the present invention. The surface hardened regions are between about 100 μm and 200 μm in thickness at each side of the article. In this embodiment of the present invention, surface hardness can range from about 150 kgf/mm$^2$ to about 550 kgf/mm$^2$. It should be noted that the commercially pure titanium substrate foil used in the embodiments of FIG. 3 has a hardness of about 98 kgf/mm$^2$ on the Vicker's scale. Thus, even the center region having very few whiskers has slightly improved properties. FIG. 4 shows a micrograph of such a center region having small trace amounts of titanium monoboride whiskers therein. These whiskers are typically not grown from a surface but rather infiltrate into the center region and randomly precipitate and begin growth at various points within the bulk titanium mass. The borided titanium articles of the present invention exhibit dramatically improved surface properties such as wear resistance. For example, typical wear performance of the borided titanium articles can be less than about 1 mg of material loss compared to about 40 mg of material loss for the non-borided titanium mass when abraded against 150 grit garnet cloth containing 100 μm garnet particles with a surface pressure of about 2 MPa.

In yet another embodiment of the present invention, the titanium mass can be a large mass such that the borided titanium article has a surface hardened region and a titanium region which is substantially free of titanium monoboride whiskers. Unlike the previous embodiment, wherein the titanium mass is sufficiently thin that interior portions of the titanium mass contain whiskers, larger titanium masses having thicknesses of several millimeters to almost any practical thickness can have regions in which essentially no whiskers are present. In yet another alternative embodiment of the present invention, the surface hardened regions can comprise substantially all of the titanium mass. The specific dimensions and characteristics of the titanium monoboride whiskers are largely determined by the process conditions and materials used which are described in more detail below.

Figure 5:
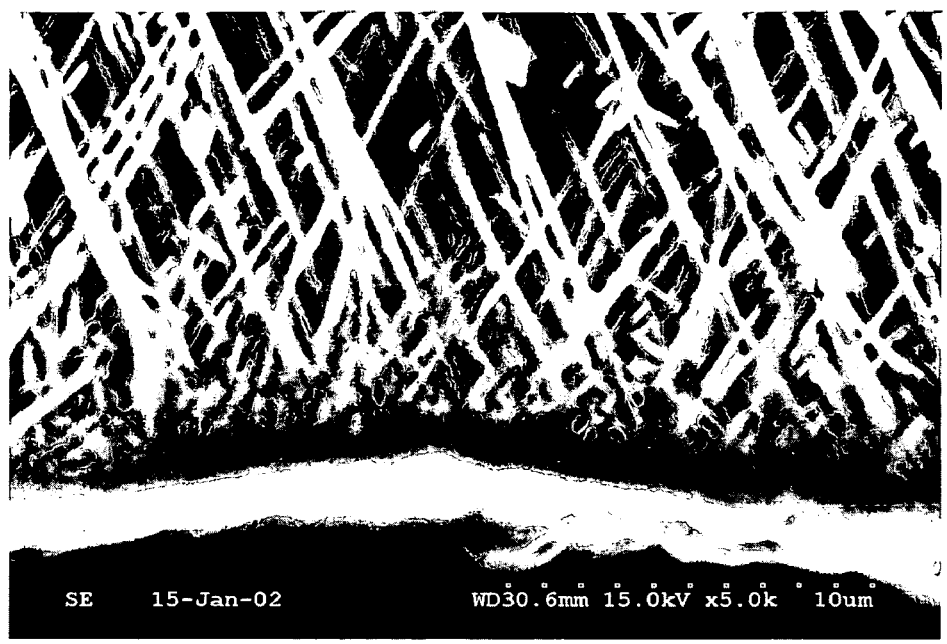
FIG. 5 shows a micrograph of the surface hardened region of FIG. 2 at a magnification of 5000×.

Referring again to FIG. 1, the borided titanium article 10 can further include one or more titanium diboride layers 18 (also shown as a grey layer in the lower portion of FIG. 5, marked with a dashed line) adjacent the surface hardened regions 14. It should be noted that the titanium diboride layer shown in FIG. 5 is slightly tilted from normal to the printed page such that a portion of the outer surface is visible as a lighter area below the grey area. This optional titanium diboride layer can provide additional surface wear resistance, hardness, oxidation resistance, and corrosion resistance. In addition, such diboride layers can act as an anchor to the titanium monoboride whiskers further enhancing the properties of the surface hardened region. In one detailed aspect of this embodiment, the titanium diboride layer(s) can have a thickness from about 5 μm to about 10 μm, although other thicknesses can be used depending on the intended application.

The borided titanium articles of the present invention can be used in any number of applications. The surface hardened titanium articles can be of particular interest in applications which require materials having high strength, low density, high stiffness, and good corrosion and oxidation resistance, while also exhibiting good wear resistance and high surface hardness. Several non-limiting examples of suitable applications which can incorporate the borided titanium articles of the present invention include orthopedic devices, gears, bearings (including ball bearing, rod bearings, and the like), pins, rivets, knives, razors, scalpels, and gun barrels. In an additional aspect of the present invention, the surface hardened regions and the optional titanium diboride layers are also electrically conductive. This electrical property can be useful in applications where resistance to spark-induced erosion is desirable.

Exemplary Production Methods

Figure 6:
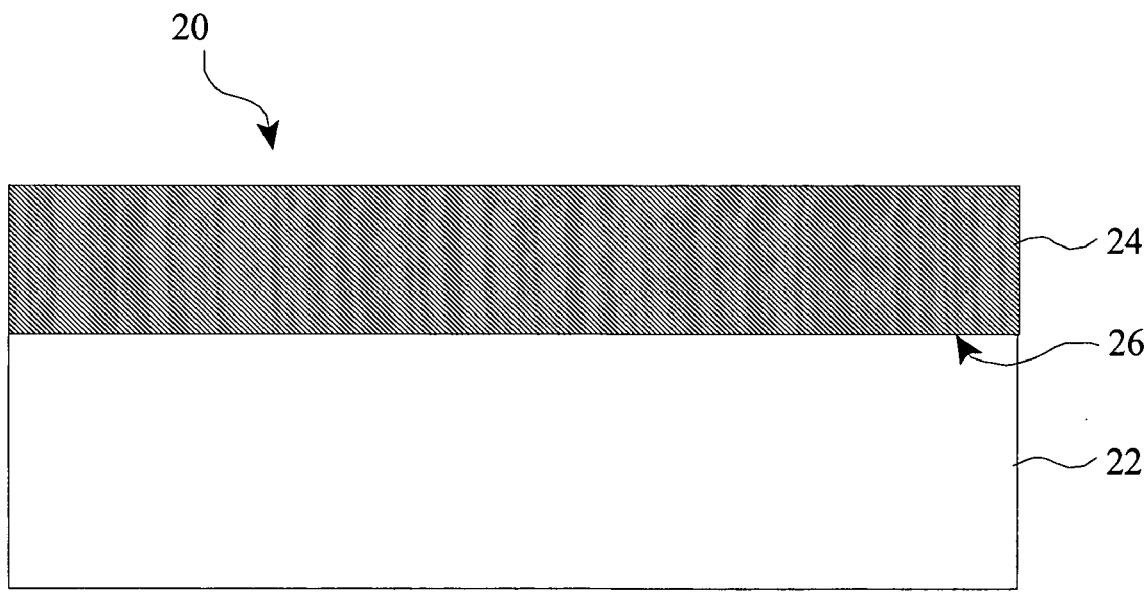
FIG. 6 illustrates a side cross-sectional view of a boron titanium precursor used to form the borided titanium article of FIG. 1 in accordance with one embodiment of the present invention.

Various methods can be used to produce the borided titanium articles of the present invention. Referring now to FIG. 6, a method of forming a borided titanium article can include providing a titanium mass 22, which generally corresponds to the titanium mass 12 of the final article as shown in FIG. 1. The titanium mass can be provided as a solid titanium substrate which is then surface treated. Alternatively, the titanium mass can be provided as a powder where consolidation and formation of the substrate is accomplished nearly simultaneously with formation of the titanium monoboride whiskers. Thus, the titanium mass can be a solid, sintered, partially sintered, porous, semi-porous, or a powdered mass. Sintered, partially sintered, porous, and semi-porous masses can provide for increased infiltration of whisker growth into the surface of the titanium mass. However, it can sometimes be desirable to surface harden a preexisting solid titanium substrate. Those skilled in the art will recognize different variations of titanium masses which may be suitable for a particular application.

Suitable materials for use in the titanium mass can include almost any titanium based metal, composite, or alloy. In one detailed aspect of the present invention, the titanium mass can comprise a member selected from the group consisting of high purity titanium, commercial grade titanium, α-titanium alloy, α+β titanium alloy, β-titanium alloy, and combinations thereof. In an additional detailed aspect, the titanium mass can comprise commercial grade titanium. Although titanium content can vary considerably, typically the titanium mass can be a titanium alloy having a titanium content greater than about 60 wt %. Further, it will be understood that a wide variety of titanium composites can also be treated using the methods of the present invention. Several non-limiting examples of suitable titanium composites include titanium coated materials, titanium masses containing ceramic carbides, nitrides, oxides or other abrasives, particulate, fiber or short-fiber reinforced titanium composites containing reinforcements such as SiC, TiC, $TiB_2$, $Si_3N_4$, and $Al_2O_3$.

Referring again to FIG. 6, a surface of the titanium mass 22 can be contacted with a boron source medium 24 to form a titanium boron precursor 20. The boron source medium can comprise a boron source selected to provide growth of titanium monoboride whiskers. The boron source medium can be provided as a solid particulate mixture, liquid mixture, or gas mixture, each of which is described in more detail below. In one aspect of the present invention, the boron source medium can include a boron source and an activator. Alternatively, the boron source medium can consist essentially of a boron source. The titanium mass and boron source medium can then be heated to a temperature from about 700° C. to about 1600° C., such that titanium monoboride whiskers are infiltrated into a region of the titanium mass. Typically, ambient to moderate pressures of a few atmospheres can be employed. Further, the methods of the present invention can be preferably performed in an inert atmosphere such as hydrogen or a noble gas.

Generally, upon heating the titanium boron precursor 20, the boron source reacts with titanium at an interface 26 of the boron source medium 24 and titanium mass 22 to form a titanium diboride layer. The titanium diboride can then react with the titanium to form titanium monoboride whiskers. Equations 1 through 2 describe the dominant participating reactions.

$$Ti + 2B \rightarrow TiB_2 \quad (1)$$

$$Ti + TiB_2 \rightarrow 2TiB \quad (2)$$

Therefore, in one aspect, the titanium diboride layer acts as an intermediate transfer mechanism for boron to infiltrate into the titanium mass from the boron source medium. Currently preferred conditions provide a boron concentration of less than about 18 wt % to about 18.5 wt % in the region of titanium monoboride formation. This is at least one reason that the whiskers infiltrate predominantly inward toward the bulk non-borided titanium mass containing lower concentrations of boron. As the boron infiltrates through the titanium mass, most of the boron will precipitate out to form whiskers such as those shown in FIG. 2.

In one alternative embodiment, subsequent to TiB growth, the titanium diboride layer can be removed using either mechanical or chemical techniques such as laser, wire EDM, acid etching, and the like. Alternatively, the process conditions can be controlled so as to minimize or even eliminate the formation of a significant titanium diboride layer. For example, the boron source, process temperature, and titanium mass composition can each affect the thickness of the titanium diboride layer formed. Relatively high process temperatures (e.g., greater than the β-transus temperature), dilute boron sources (e.g., less than about 18 wt %) and longer process times (e.g., greater than 24 hrs) can decrease or eliminate the titanium diboride layer. Conversely, relatively low process temperatures (e.g., less than the β-transus temperature), high concentration of boron in source (e.g., greater than about 18 wt %) and shorter process times (e.g., less than 24 hrs) can increase the titanium diboride layer.

Figure 7:
FIG. 7 is a micrograph of a surface hardened region in a whisker borided titanium article produced at 1000° C. in accordance with an embodiment of the present invention at a magnification of 2000×.
Figure 8:
FIG. 8 is a micrograph of a surface hardened region in a whisker borided titanium article produced in accordance with an embodiment of the present invention at a magnification of 7000×.

The rate at which whiskers are formed depends on the specific boron source, boron concentration gradients, and the temperature employed. For example, using a commercial grade titanium substrate, a process temperature of about 1000° C. resulted in thicker and larger whiskers, as seen in FIG. 7, than whiskers produced at a temperature of about 850° C., as seen in FIGS. 2 and 5. As a general guideline, the specific process temperature strongly affects the shape and diameter of the whiskers. For example, in some embodiments, process temperatures below the β-transus temperature produce whiskers having a diameter of from about 100 nm to about 600 nm. As the process temperature increases, the diameter of a portion of the whiskers can increase up to about 2 μm. Thus, in some embodiments of the present invention, process temperatures from the β-transus temperature to about 1600° C. result in whiskers having diameters from about 100 nm to several micrometers. Similarly, process time can influence whisker length and thus the thickness of the surface hardened region. Increasing process times can also result in a thickening of the whiskers. Typical process times can range from about 1 hour to about 24 hours. In an additional aspect of the present invention, the titanium monoboride whiskers can form an interconnected structure as shown in FIG. 8, which is somewhat more random than those shown in FIGS. 2, 5 and 7. Optimal whisker dimensions can depend in the intended application. However, in several embodiments of the present invention, it has been found that hardness can be optimized at a process temperature which is the highest temperature achievable which is also below the β-transus temperature. The specific heating method can limit the actual achievable temperature and can depend on the variability of control for the specific equipment used. For example, depending on the heating device, the temperature may be maintained within 2° C. to 3° C. or within about 5° C. to 8° C. below the β-transus temperature. Those skilled in the art will recognize, however, that this is merely a guideline and that temperatures and times outside those indicated may also be used to achieve improved surface properties.

In one aspect of the present invention, the titanium mass and boron source medium can be heated to a temperature from about 25° C. below the β-transus temperature to about 20° C. above the β-transus temperature of the titanium mass. In a more detailed aspect of the present invention, the titanium mass and boron source medium can be heated to a temperature from about 15° C. below the β-transus temperature to about the β-transus temperature of the titanium mass. Process temperatures in this range typically form relatively thin whiskers such as those shown in FIG. 2. Alternatively, the titanium mass and boron source medium can be heated to a temperature of from about the β-transus temperature to about 100° C. above the β-transus temperature of the titanium mass. In embodiments where the titanium mass is a commercial grade titanium substrate, currently preferred process temperature can range from about 840° C. to about 880° C., with about 860° C. being most preferred, i.e. about the β-transus temperature of pure titanium. In some cases, it may be desirable to form thicker whisker structures infiltrated into the titanium mass. These larger whisker structures can be formed at higher temperatures such as from about 100° C. above the β-transus temperature to about 1600° C., although the exact range will depend at least partially on the specific composition of the titanium mass. High purity or commercially pure titanium substrates can be heated from about 1000° C. and about 1600° C. to form larger whiskers. Additionally, for example, the β-transus temperature of the α+β titanium alloy Ti-6Al-4V is about 1010° C. Therefore, the preferred process temperature range for producing relatively thin whiskers in this titanium mass would be from about 985° C. to about 1030° C. (1050° C. to 1040° C.), and most preferred about 1010° C. In contrast, to form larger whisker structures in this titanium alloy, the preferred temperature range can be from about 1110° C. to about 1600° C. Those skilled in the art can determine appropriate temperature ranges for various other titanium alloys based on the above discussion.

In one embodiment of the present invention, the boron source medium 24 can be a particulate mixture of a boron source, activator, and filler. The boron source can be any boron source which allows for elemental boron to infiltrate into the titanium mass to form titanium monoboride. Non-limiting examples of suitable boron sources include amorphous boron, crystalline boron, ferroboron, boron carbide, boron nitride, and combinations thereof. In one aspect of the present invention, the boron source can be amorphous boron.

Typically, the boron source can comprise from about 30 wt % to about 80 wt % of the boron source medium, while from about 40 wt % to about 65 wt % is currently preferred. Frequently, the particulate mixture can be packed around or otherwise placed in contact with the titanium mass to form the titanium boron precursor 20. The thickness of the particulate mixture can vary depending on the specific composition; however thicknesses from about 15 mm to about 40 mm can typically provide a sufficient supply of boron for titanium monoboride infiltration and growth. The titanium boron precursor can then be placed in a suitable heating assembly such as a ceramic or refractory metal crucible. In one alternative embodiment, the particulate mixture can be placed in contact solely with surfaces of the titanium mass which are to be hardened. In some embodiments of the present invention, it can be desirable to selectively treat surfaces of the titanium mass, rather than the entire mass. In such embodiments, selected areas can be covered with an inactive filler material such as carbon powder or the like.

Suitable activators for use in the particulate mixture can include, but are not limited to, sodium carbonate, calcium carbonate, alkali bicarbonates, alkali halides such as NaCl and NaF, $KBF_4$, $CaF_2$, $NH_4Cl$, BaF, and combinations thereof. In one embodiment of the present invention, the activator can be sodium carbonate. Typically, the activator can comprise from about 2 wt % to about 40 wt % of the boron source medium, while from about 10 wt % to about 25 wt % is currently preferred. Additionally, known accelerators can also be used in the present invention, such as titanium halides, e.g., $TiCl_2$, discussed in U.S. Pat. No. 5,464,699, which is hereby incorporated by reference.

The balance of the boron source medium can be any filler material which does not detrimentally affect infiltration of boron into the titanium mass. Although a wide variety of filler materials can be used, several non-limiting examples include activated carbon, talc, ceramic oxides such as $Al_2O_3$, $ZrO_2$, $TiO_2$, $SiO_2$, MgO, and combinations thereof. It has been found that activated carbon provides good results. The activated carbon can also contribute to removal of oxygen which might otherwise interfere with growth of titanium monoboride whiskers by forming titanium oxide, $TiO_2$.

In an alternative embodiment of the present invention, the boron source medium can be a liquid mixture of a boron source, activator, and filler. Several non-limiting examples of suitable liquid boron sources include borax, anhydrous borax, metaboric acid, sodium borofluoride, potassium borofluoride, boric acid, boron fluoride, and combinations thereof. Small amounts, e.g., 1 to 5 wt %, of solid boron carbide can also be optionally added to increase diffusion of boron toward the titanium mass. In one aspect, the boron source can be anhydrous borax. Although concentrations can vary, the liquid boron source can comprise from about 10 wt % to about 80 wt % of the boron source medium. Activators suitable for use in a liquid mixture can include halide activators such as NaCl, KCl, and $NH_4Cl$. Suitable liquid filler materials can include any liquid carrier such as molten metals, carbon, molten salts such as NaCl, $BaCl_2$, or other appropriate inert materials. It should be noted that suitable liquid boron source medium of the present invention can typically include materials which are solids at room temperature. However, such solid mixtures are typically a liquid when heated to the process temperatures employed herein for whisker infiltration and growth. In one detailed aspect of the present invention, the liquid boron source medium can be a molten salt mixture. The liquid filler can be chosen to increase or decrease the viscosity of the mixture depending on the desired coating thickness. The titanium mass can be completely or partially immersed in the liquid boron source at the desired process temperature and time as discussed above, in order to achieve the desired titanium monoboride whisker structures.

In yet another alternative embodiment of the present invention, the boron source medium can be provided as a gaseous mixture of a boron source, activator, and filler. Several non-limiting examples of suitable gaseous boron sources can include boron halides such as $BF_3$, $BCl_3$, and $BBr_3$; diboranes such as $B_2H_6$; organic boranes such as $(CH_3)_3Br$ and $(C_2H_5)_3B$; and combinations thereof. Currently preferred gaseous boron sources are boron halides. Suitable gaseous activators can include, but are not limited to, hydrogen, noble gases, or any other gas which can be used as a carrier or inert filler gas to enable transport of boron source to a titanium surface. Typically, the gaseous boron source can react with the activator at the surface of the titanium mass releasing elemental boron at the surface. The elemental boron can then form titanium diboride thus allowing boron to infiltrate into the titanium mass to form the titanium monoboride whiskers as discussed previously. Any concentration of boron source and activator can be used which is sufficient to provide adequate boron at the surface of the titanium mass. However, as a general guideline, the gaseous mixture can have a boron source to activator molar ratio from about 1:10 to about 1:20. In one specific embodiment, a mixture of $BCl_3$ and $H_2$ can have a molar ratio of about 1:15.

Those skilled in the art will recognize that many of the recited boron source materials, activators, and fillers can be used interchangeably in either the solid, liquid, or gas phase methods and such variations are considered within the scope of the present invention. Each of the above described solid, liquid, and gas phase methods for forming whisker borided titanium articles can be used advantageously in a wide variety of applications. For example, the liquid and gas phase methods can be used to boride titanium substrates which are difficult to contact with a solid powder. One example of such a surface would be the interior surfaces of rifles and gun barrels. Additionally, the solid phase method can provide a high concentration of boron for formation of whiskers, thus improving processing times. Using the methods of the present invention, titanium surfaces which are relatively flat can be treated, as well as surfaces having complex shapes and contours. The methods of the present invention can result in increased surface hardness, corrosion resistance, improved wear resistance, reduced galling, increased oxidation resistance, abrasion resistance, scratch resistance, and improved resistance to mechanical contact damage.

Those skilled in the art will also recognize numerous applications for the borided titanium articles of the present invention. For example, the borided titanium articles of the present invention can be formed and incorporated into a final product such as orthopedic devices, gears, bearings, pins, rivets, knives, razors, scalpels, high pressure nozzles, or gun barrels. Orthopedic devices which have titanium surfaces can be of particular interest. Examples of such devices include femoral heads, acetabular cups, knee joints, spine implants, and the like. The borided titanium surfaces of the present invention can also be advantageously used to improve wear and oxidation properties of an inner bore of a gun barrel, including handguns, rifles, and larger caliber guns mounted on armored vehicles and the like. Such borided titanium gun barrels exhibit increased useful life, improved accuracy over time, and maintenance of bore shape even after a large number of rounds. An additional application of the borided titanium articles of the present invention can include equipment used in handling molten aluminum such as pouring spouts, nozzles, and crucibles. Specifically, electrolysis of aluminum during extraction from bauxite ore requires equipment surfaces which are highly resistant to corrosion. Regardless of the specific application, the methods of the present invention also allow for repeated surface treatment. Thus, once the surface hardened region is worn away or otherwise damaged, the article can be inexpensively treated using the methods described above to provide a new surface hardened region.

Additionally, the methods described above can be applied to metals which are strong boride formers which also allow formation of metal boride whiskers. These materials can allow infiltration of boron and formation of metal boride whiskers in a similar manner as described above in connection with titanium. Strong boride formers are those metals which form boride compounds that are thermodynamically stable at room temperature. Additional suitable metal substrates such as zirconium, cobalt-chromium, and alloys thereof can be used. Although iron, nickel, and their alloys are generally considered strong boride formers, these materials do not form metal boride whiskers, but rather a monolithic layered structure.

For example, in one aspect of the present invention, the metal mass can include a hexagonal close packed (HCP) metal such as, but not limited to, Ti, Zr, Mg, and alloys thereof. In one preferred embodiment, the metal mass can comprise zirconium or its alloys. Zirconium alloys are typically used in orthopedic, nuclear and other high temperature applications. Several examples of suitable zirconium alloys can include, without limitation, Zr-4.5Hf, Zr-2.5Nb, Zr-4.5Hf-2.5Nb, and Zr—Cr—Cu alloys. The β-transus temperature of Zr is 863° C. Thus, in accordance with the principles of the present invention, process temperatures below 863° C. produce $ZrB_2$ whiskers infiltrating the zirconium mass and grown bi-directionally, similar to FIGS. 2 and 5. Similarly, at process temperatures above 863° C. relatively thicker $ZrB_2$ whiskers are grown nearly normal to the surface of the metal mass treated. The mechanical properties of $ZrB_2$ whiskers are comparable to those described for titanium monoboride, therefore similar practical applications can include orthopedic devices, gears, bearings, pins, rivets, knives, razors and scalpels.

In another aspect of the present invention, the metal mass can be a cobalt-chromium alloy. Non-limiting examples of suitable cobalt-chromium alloys include Co-30Cr, Co-29Cr- 7Mn-1Mo, and Co-25Cr-3Fe-3Ni (stellite). The above boron source medium, materials, and methods can be applied to enhance the surface properties of cobalt-chromium alloys. In this case, the solid, liquid or gaseous phase methods can result in the growth of cobalt boride and chromium boride whiskers infiltrating into the bulk cobalt-chromium alloy. The presence of two metal boride whisker compositions can provide improved surface hardness and wear resistance of over several factors when compared to untreated cobalt-chromium masses. However, the structure of the metal boride whiskers can be different from that formed in titanium or zirconium substrates. This is partially the result of the crystal structure of cobalt-chromium alloys which is a body centered cubic structure. The surface hardened region therefore can have a structure that is intermediate between the whisker structures described above and a monolithic layered structure. The surface hardened region having cobalt and chromium boride whiskers can exhibit improved surface properties such as hardness, wear resistance, oxidation, and corrosion resistance, as well as increased resistance to galling and seizure during mechanical contact. For example, cobalt-chromium orthopedic implants can be treated in accordance with the principles of the present invention to increase surface hardness and reduce wear between contacting surfaces.

The following examples illustrate exemplary embodiments of the invention. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what is presently deemed to be a practical embodiment of the invention.

EXAMPLES

Example 1

A commercial grade titanium sheet having a thickness of 1 mm was provided. A powdered mixture of 50 wt % amorphous boron (325 mesh available from Alfa Aesar, Inc.), 15 wt % anhydrous sodium carbonate, and 35 wt % activated charcoal was evenly mixed in an argon environment to avoid oxidation and blended for 24 hours in a tumbling mill. The powdered mixture was then packed around the titanium sheet to a depth of about 25 mm to form a boron titanium precursor. The precursor was then placed in a resistance heated furnace and heated to about 850° C. for about 24 hours. The titanium sheet was then allowed to cool. The surface hardened region was characterized by whiskers similar to those of FIG. 2 having an average length of about 78 µm, a maximum surface hardened region thickness of over 0.2 mm, and a maximum surface hardness of 411 kgf/mm$^2$.

Example 2

A liquid boron source medium is provided by preparing a molten solution of 25 wt % anhydrous borax, 45 wt % NaCl, and 30 wt % carbon. The liquid boron source is placed in a tantalum crucible and a 34-tooth β-titanium (Ti-10V-2Fe-3Al) gear is then immersed in the liquid boron source. The liquid boron solution is heated to about 860° C. and held for about 15 hours. A thin borided region having a thickness of about 0.1 mm is formed.

Example 3

A gaseous boron source medium is provided by preparing a mixture of 2 vol. % boron chloride, 40 vol. % wt % hydrogen, and balance argon in an enclosed chamber. The mixture is pumped at a rate of 1 cm/sec into enclosed chamber containing an α-titanium (Ti-5Al-2.5Sn) gun barrel having a 0.22 inch inner diameter. The chamber is heated to about 880° C. prior to the entry of the gas using a resistive heating element. The chamber is held at this temperature for about 10 hours. A borided region having a thickness of about 0.25 mm is formed on the inner barrel surfaces and the exposed outer surfaces.

It is to be understood that the above-referenced arrangements are illustrative of the application for the principles of the present invention. Thus, while the present invention has been described above in connection with the exemplary embodiments of the invention, it will be apparent to those of ordinary skill in the art that numerous modifications and alternative arrangements can be made without departing from the principles and concepts of the invention as set forth in the claims.

What is claimed is:

1. A method of forming a borided titanium article, comprising the steps of:
   a) providing a titanium mass;
   b) contacting a surface of the titanium mass with a boron source medium, said boron source medium comprising a particulate mixture of a boron source, activator, and filler selected to provide growth of titanium monoboride whiskers; and
   c) heating the titanium mass and boron source medium to a temperature for a suitable time period such that titanium monoboride whiskers are formed in a region of the titanium mass to form a titanium monoboride coating, wherein titanium monoboride in said titanium monoboride coating is predominantly whiskers.

2. The method of claim 1, wherein the boron source medium is a particulate mixture consisting essentially of a boron source.

3. The method of claim 1, wherein the boron source is amorphous boron.

4. The method of claim 1, wherein the activator is sodium carbonate.

5. The method of claim 1, wherein said titanium mass has a β-transus temperature and comprises commercial grade titanium.

6. The method of claim 1, wherein the step of heating occurs at a temperature near the β-transus temperature of the titanium mass.

7. The method of claim 1, wherein the filler is activated charcoal.

8. The method of claim 1, wherein an average boron concentration in a reaction zone of the region of the titanium mass is less than 18.5 wt %.

9. The method of claim 1, wherein the step of heating the titanium mass and boron source medium occurs such that a titanium diboride layer is formed adjacent the titanium monoboride coating opposite the titanium mass.

* * * * *

UNITED STATES PATENT AND TRADEMARK OFFICE
CERTIFICATE OF CORRECTION

| | | |
|---|---|---|
| PATENT NO. | : 7,264,682 B2 | Page 1 of 1 |
| APPLICATION NO. | : 11/122119 | |
| DATED | : September 4, 2007 | |
| INVENTOR(S) | : K.S. Ravi Chandran and Shampa Aich | |

It is certified that error appears in the above-identified patent and that said Letters Patent is hereby corrected as shown below:

Insert on the Title Page:

--Related U.S. Application Data

[63] Continuation of application No. PCT/US2003/036833, filed November 17, 2003.

[60] Provisional patent application No. 60/426,636, filed November 15, 2002.--

Signed and Sealed this

Eighth Day of January, 2008

JON W. DUDAS
*Director of the United States Patent and Trademark Office*